June 4, 1963 F. G. REED 3,092,044
PALLETIZED VEHICLE DECK
Filed Feb. 8, 1960

INVENTOR:
FRANK G. REED
BY
ATTORNEYS

United States Patent Office 3,092,044
Patented June 4, 1963

3,092,044
PALLETIZED VEHICLE DECK
Frank G. Reed, 214 S. Robin Road, West Covina, Calif.
Filed Feb. 8, 1960, Ser. No. 7,254
3 Claims. (Cl. 105—369)

This invention relates to and in general has for its object the provision, in combination with the deck of a freight-carrying vehicle, of one or more channels recessed in said deck for the accommodation of fittings translatable therein and to which load-supporting rails are secured for translation therewith and for rotation relative thereto through at least 90° in either direction.

The use of fork lift trucks greatly facilitates the work of loading and unloading freight cars and other vehicles. However, advantage can be taken of a lift fork for this purpose only if the load is palletized or if it is supported on spaced rails or slats for the accommodation of the tines of the fork.

Shipping on pallets means that both the shipper and the consignee have to keep track of the pallets, and the use of loose slats or planks is objectionable, for the carrier is then left with a lot of dunnage to dispose of at the point of destination.

More specifically, then, one of the objects of this invention is the attachment to the deck of a vehicle of a plurality of rails for movement longitudinally of the deck and for rotation thereon to any desired angle with the result: that they can all be positioned at one or the other end of the deck or at any other part thereof so as to clear other areas of the deck; that they can be grouped in different areas of the car; that selected numbers of them can be spaced in parallelism with each other transversely of the deck, and that other selected numbers thereof can be arranged in parallelism with each other longitudinally of the vehicle. When disposed in spaced parallelism with each other transversely of the deck they serve as entryways for the forks of a truck for side loading, and when placed longitudinally of the vehicle they serve as entryways for the forks for end or center loading.

The invention possesses other advantageous features, some of which, with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in other forms.

Referring to the drawings.

Figure 1:
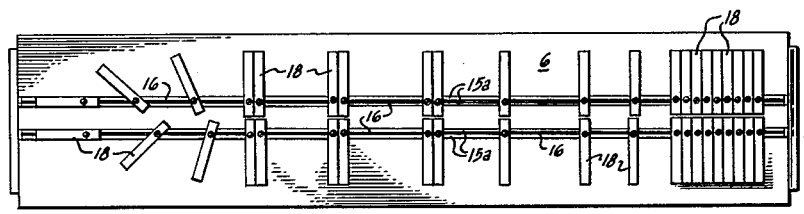
FIG. 1 is a schematic drawing of the deck of a transport showing some of the various ways in which the rails of my invention may be oriented.
Figure 2:
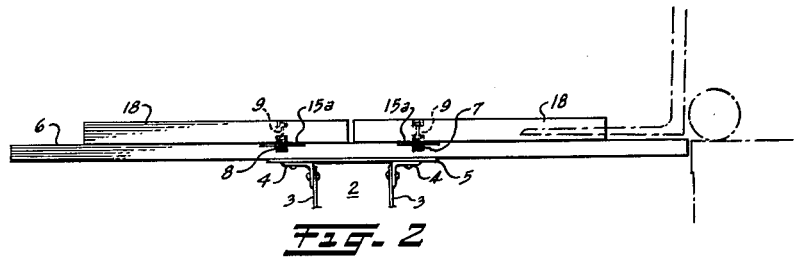
FIG. 2 is a fragmentary end elevation of a freight car equipped with the rails of my invention and illustrating the side loading of such car.

As illustrated in these figures, a conventional freight car includes a center sill, generally designated by the reference numeral 2, including a pair of parallel spaced plates 3. Riveted to each such plate are longitudinally extending angles 4 and extending transversely across the two angles are plates 5.

Supported on the center sill so formed and on the side sills (not shown) of the car is a wooden floor or deck 6 conventionally made of planking.

Essential to my invention is only that a transport of some kind be provided with a floor or deck of some kind, the above details being shown merely as representing a more or less conventional freight car deck.

Formed in the deck 6 are a pair of symmetrically disposed, longitudinally extending rabbits or channels 7 and 8. Accommodated in each of the channels 7 and 8 are a plurality of inverted bolts 9, each including a head 11. Mounted on each of the bolt heads 11 is a washer 12.

Figure 3:
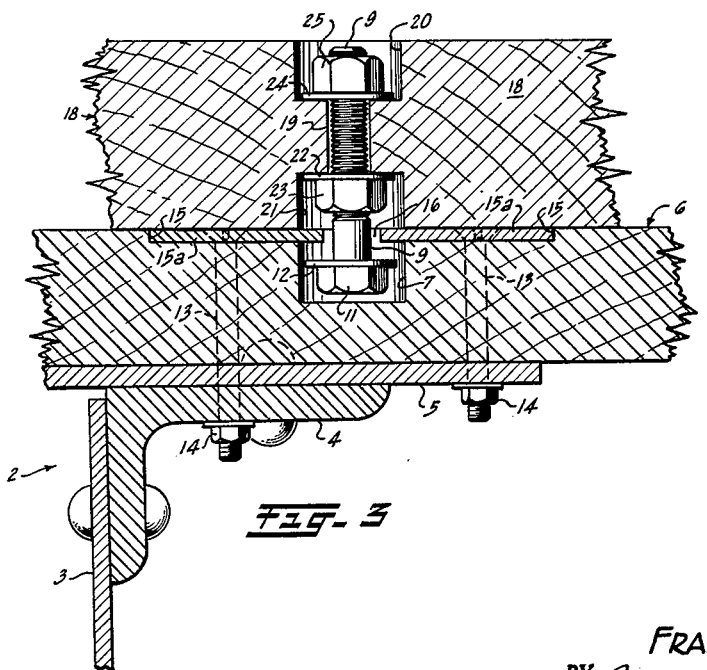
FIG. 3 is an enlarged fragmentary transverse section of the car illustrated in FIG. 2 taken at the center line thereof.

Secured to the deck 6 by bolts 13 and nuts 14 along each side of each of the channels 7 and 8, and within a longitudinally extending recess 15, are plate sections 15a. From FIG. 3 it will be seen that the adjacent edges of each pair of such plates sufficiently overhang their common channel 7 or 8 to prevent the bolt heads 11 from being removed therefrom. However, the adjacent edges of each pair of plates 15a define a slot 16 extending longitudinally of the deck and through which each of the bolts 9 contained in the underlying channel 7 or 8 can be bodily translated to any desired location along the channel.

Supported or resting on the deck are a plurality of floor bearing pieces or rails 18, there being one such rail for each of the bolts 9. Each rail is provided intermediate its ends with a bore 19 for the reception of one of the bolts 9. Formed at the lower end of the bore 19 is a counter sink 21 for the reception of a washer 22 and a lock nut 23 mounted on the bolt 9. Similarly formed at the upper end of the bore 19 is a counter bore 20 for the reception of a washer 24 and a second lock nut 25 mounted on the upper end of the bolt 9.

As a result of this construction, each of the rails can be clamped to its associated bolt 9 by the lock nuts 23 and 25. Each rail can then be translated along its associated channel and rotated over the floor or deck through 360° about the axis of its bolt. At the same time each rail is permanently affixed to the deck by virtue of the head of the nut and the overhanging edges of the plates 15. Since the end of each bolt 9 and its associated clamping nut 25 lie entirely below the upper face of their associated rail, the upper face of the rail is unobstructed and thus free to have a load pushed or deposited thereon by a lift fork.

For side-loading such a deck the rails are located in parallelism with each other across the deck with their center lines spaced on a modulus substantially equal to the modulus on which the tines of the fork are spaced. The rails therefore serve as entryways for the tines.

If it is desired to end-load the car longitudinally thereof or load from its center longitudinally thereof, two rails or two pairs of rails are located in parallel with each other longitudinally of the deck. The remaining rails are then moved to the other end of the car or at least out of the way. This having been done, a second pair of rails are aligned longitudinally of the car and opposite each other and a second unit load deposited thereon. If the load is longer than the length of one rail, two sets of rails can be used in tandem disposition.

In summary, this structure makes possible end-loading or side-loading, maintains the rail permanently attached to the deck, and makes possible clearing any desired portion of the deck by merely moving the rails elsewhere.

I claim:

1. In a vehicle: a deck having a longitudinally extending, undercut channel formed therein; a rail resting flat on said deck over said channel; said rail being formed with a vertical bore, counterbored at both ends thereof; an inverted bolt extending upwardly through said bore with its head confined within said channel; and a pair of nuts threaded on said bolt, one within the confines of each of said counterbores, thereby to clamp said bolt firmly to said rail; said rail being bodily translatable along said channel and freely rotatable at any point along said channel about the axis of said bolt.

2. In a vehicle: a deck having a pair of spaced, parallel, longitudinally extending, undercut channels formed therein; a pair of rails resting flat on said deck, one over each of said channels, each of said rails being formed with a vertical bore, counterbored at both ends thereof; an inverted bolt extending upwardly through each of said bores with its head confined within one of said channels; a pair of nuts threaded on each of said bolts within the confines of each of said counterbores thereby to clamp said bolt to its associated rail; each of said rails being bodily translatable over said channel and freely rotatable about the axis of its bolt.

3. A structure such as set forth in claim 2 wherein each bolt is clamped to its associated rail at a distance from one end thereof not greater than one-half the distance between said channels, thereby to permit the said ends of said rails always to clear each other regardless of their positions.

References Cited in the file of this patent

UNITED STATES PATENTS

| | | |
|---|---|---|
| 1,760,089 | Snyder | May 27, 1930 |
| 1,780,318 | Snyder | Nov. 4, 1930 |